May 18, 1954  H. NICK  2,678,826
CHUCK FOR SHANKLESS DRILLS OR REAMERS
Filed Aug. 4, 1952

INVENTOR
HARRY NICK

BY

ATTORNEYS

Patented May 18, 1954

2,678,826

UNITED STATES PATENT OFFICE 2,678,826

CHUCK FOR SHANKLESS DRILLS OR REAMERS

Harry Nick, Milwaukee, Wis.

Application August 4, 1952, Serial No. 302,469

2 Claims. (Cl. 279—48)

This invention appertains to tool holders and more particularly to a novel chuck for receiving and gripping shankless drills, reamers, etc., to permit the effective use thereof.

In the shops of machine and manufacturing companies, there is a constant breakage of drills and reamers resulting in loss and waste. In such broken drills, there are a great many of sufficient length to permit the use thereof, if such drills could be firmly held in a tool chuck or socket.

It is therefore, one of the primary objects of my invention to provide a novel chuck which will firmly hold a broken or shankless drill or reamer against chattering and in correct axial alignment with the longitudinal center of the chuck and for firmly gripping and holding the drill against turning and endwise movement in the chuck.

Another salient object of my invention is the provision of a split sleeve or collet for receiving and supporting the fluted portion of a drill for a considerable portion of its length mounted within a bore or socket formed in the forward end of the head of the chuck, with means on the head for tightly contracting the collet about the fluted portion of the drill.

A further important object of my invention is to provide a novel drill driver plate associated with the head of the chuck for movement therewith having means thereon engaging the flutes of the drill for co-action with a sleeve nut on the head for facilitating the contracting of the collet about the drill.

A still further important object of my invention is the provision of novel means for forming the head of the chuck for receiving the split collet and the driver plate, so as to insure the correct gripping of the collet with the drill upon the tightening of the sleeve nut with the driver plate.

A still further object of my invention is to provide a chuck for broken or shankless drills, reamers and the like which will be durable and efficient in use, one that will be simple and easy to manufacture and one which can be placed on the market at a reasonable cost.

With these and other objects in view, the invention consists in the novel construction, arrangement and formation of parts, as will be hereinafter more specifically described, claimed and illustrated in the accompanying drawings, in which drawings:

Referring to the drawing in detail, wherein similar reference characters designate corresponding parts throughout the several views, the letter "C" generally indicates my novel chuck for receiving a broken or shankless drill "D" or the like.

Figure 1:
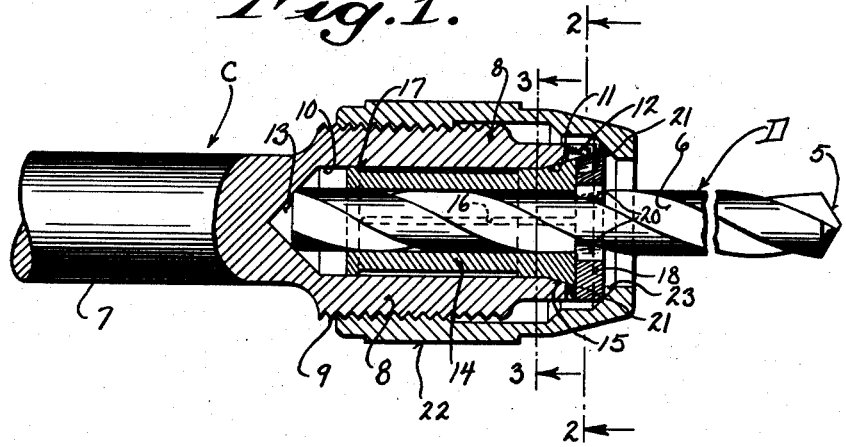
Figure 1 is a longitudinal sectional view through the forward portion of a chuck, constructed in accordance with my invention, the view showing a shankless drill held therein.

The drill "D," itself, forms no part of the present invention and it can be seen that the drill is shankless and in the present instance has been broken intermediate its ends leaving a front fluted end thereof, of material length which can be effectively used, when held by my chuck "C." As shown, the drill "D" is provided with the usual tapered boring terminal 5 and spiral flutes 6.

The chuck "C" includes a shank 7 for connection with the tool holder of a drill press or other machine (not shown). The forward end of the shank 7 has formed thereon the head 8 provided with external threads 9 for a portion of its length. A longitudinally extending axially disposed bore or socket 10 is formed in the head and opens out through the forward end thereof. The wall of the bore socket, at its forward end, is provided with a conical or inwardly tapered wedge face 11, for a purpose, which will later appear and the extreme forward end of the head has formed therein radially extending notches 12 which open into the bore and out of the head at diametric opposite points. The bore, at its inner end, is preferably tapered to form a conical seat 13, the purpose of which will also later appear.

Detachably fitted within the bore or socket 10 is an elongated cylindrical hollow collet 14 and the forward end of the collet has formed thereon an outwardly tapered or cone shaped face 15 which corresponds to the tapered face 11 of the forward end of the bore or socket. The collet 14 is provided on opposite sides with longitudinally extending slots 16 which open out through the forward end of the collet. If desired, the body of the collet can be made of a slightly less diameter than the diameter of the bore 10 and in such an event, the rear end of the collet is provided with an annular rib 17 for engaging the wall of the bore. Hence, the collet, at its rear end, engages the wall of the bore and the forward end of the collet snugly engages the tapered face or seat 11 of the bore and the collet is firmly supported at its opposite ends in the bore.

As clearly shown, in Figure 1, the fluted portion of the drill is received within the collet and the collet is of such a length as to embrace the drill for a substantial portion of its length so as to form an effective support therefore.

Figure 2:
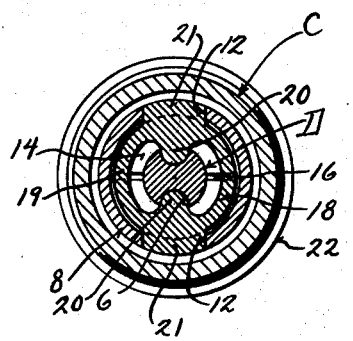
Figure 2 is a transverse sectional view through the chuck and drill taken on the line 2—2 of Figure 1 looking in the direction of the arrows and showing more particularly the novel driver plate and its association with the head of the chuck.
Figure 3:
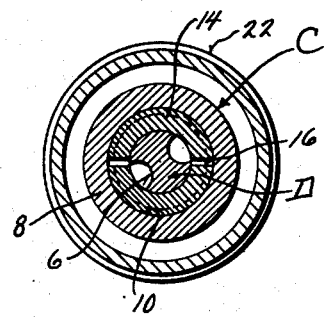
Figure 3 is a view similar to Figure 2, but taken on the line 3—3 of Figure 1 looking in the direction of the arrows and showing the collet gripping the drill.
Figure 4:
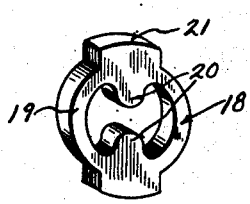
Figure 4 is an enlarged detailed perspective view of the driver plate.
Figure 5:
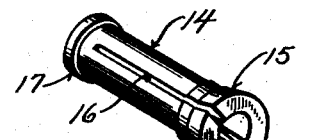
Figure 5 is a detailed perspective view of the split collet.

Disposed at the forward end of the head 8 is my novel driver plate 18 and this plate is in the form of a washer and includes an annular body 19 for receiving the drill and the inner periphery of the body has formed thereon, at opposite diametric points, inwardly extending drive ears 20 which engage in the flutes of the drill, as best shown in Figures 1 and 2. The body 19 of the plate has also formed thereon radially extending wings 21 which are received in the notches 12 at the forward end of the head so that upon rotation of the chuck the driver plate 18 will be positively rotated therewith. If desired, the outer periphery of the body 19 of the driver plate can be slightly tapered to fit the tapered seat 11 at the forward end of the bore 10.

In accordance with my invention, the driver plate 18 and the collet can receive different sizes of drills within a certain prescribed range and where larger or smaller drills outside of this range are to be held collets and driver plates of larger or smaller sizes are provided.

Threaded upon the head 8 is a sleeve nut 22 and the outer surface of this sleeve can be roughened or otherwise treated so as to permit a firm grip to be had thereon to facilitate the threading and unthreading of the sleeve nut on the head 8. The forward end of the sleeve nut is contracted and has formed therein a tapered surface 23 for engaging the wings 21 of the driver plate when the sleeve nut 22 is threaded back on the head 8.

In operation of my chuck, the various parts are assembled as shown in Figure 1 and the sleeve nut is loosened or threaded forwardly and the drill "D" is now turned in the driver plate 18 and into and through the collet with the rear end thereof preferably seated against the conical rear end 13 of the bore, which functions to center the drill.

The sleeve nut 22 is now threaded back on the head 8 tight against the wings 21 of the driver plate and as the sleeve nut 22 is threaded back, the driver plate 18 is moved forcibly into the bore against the forward end of the collet, forcing the collet in with the forward end thereof against the tapered seat 11 which brings about the contracting of the collet into a tight and intimate grip on the drill. Consequently, the drill will be effectively gripped and supported for a considerable portion of its length and the driver plate 18 held against rotation on the chuck will facilitate the setting up of the driving action between the chuck and the drill.

While, for the purpose of example, I have shown the chuck holding a drill, it is to be understood that the chuck is designed to hold shankless reamers and any other kind of a tool in a tool holder and that the driver plate 18 can be provided with any desired number of driver ears 20.

Changes in details may be made without departing from the spirit or the scope of my invention, but what I claim as new is:

1. A chuck for driving shankless drills, reamers and the like comprising a head having an axially disposed bore opening out through the forward end of the head, the wall of the bore at its forward end being tapered to provide a wedge seat, and said head having notches opening into the seat and through the outer periphery of the head, a split collet adapted to receive the fluted portion of a drill for a portion of its length and said collet having its forward end tapered and fitted upon the seat, a driver plate receiving a drill forwardly of the collet having inwardly extending drive lugs for engaging in the flutes of a drill and radially extending wings slidably received in the notches in the head, said plate engaging the forward end of the collet, and an adjusting sleeve threaded on the head having its forward end provided with a tapered surface engaging said wings for forcing back said driver plate against said collet for moving the tapered face of the collet inward on the seat of the head to contract said collet about a drill.

2. A chuck, as defined in claim 1, and the inner end of said bore having a conical seat for centering the rear end of a shankless drill or the like.

References Cited in the file of this patent

UNITED STATES PATENTS

| Number | Name | Date |
| --- | --- | --- |
| 574,077 | Sellers | Dec. 29, 1896 |
| 1,921,694 | Normand | Aug. 8, 1933 |
| 2,365,810 | Faso | Dec. 26, 1944 |
| 2,399,425 | Bozarth | Apr. 30, 1946 |

FOREIGN PATENTS

| Number | Country | Date |
| --- | --- | --- |
| 551,720 | Great Britain | Mar. 8, 1943 |